Oct. 14, 1969   F. W. STRAWSINE   3,472,150
SELF-CLOSING FLEXIBLE DAMPER
Filed Oct. 19, 1967   2 Sheets-Sheet 1

INVENTOR.
FREDERICK W. STRAWSINE
BY
Woodhams, Blanchard & Flynn
ATTORNEYS

Oct. 14, 1969    F. W. STRAWSINE    3,472,150
SELF-CLOSING FLEXIBLE DAMPER
Filed Oct. 19, 1967    2 Sheets-Sheet 2

INVENTOR.
FREDERICK W. STRAWSINE
BY
Woodhams, Blanchard & Flynn
ATTORNEYS

United States Patent Office 3,472,150
Patented Oct. 14, 1969

1

3,472,150
SELF-CLOSING FLEXIBLE DAMPER
Frederick W. Strawsine, Corunna, Mich., assignor to Strawsine Manufacturing Company, Corunna, Mich., a corporation of Michigan
Filed Oct. 19, 1967, Ser. No. 676,522
Int. Cl. F04d 25/14; F24f 13/08; F16k 15/14
U.S. Cl. 98—116                                     10 Claims

ABSTRACT OF THE DISCLOSURE

A ventilator comprising an outer cylinder having a weather-protective dome is mounted over an opening in a relatively thin, substantially horizontal roof structure. An inner cylinder mounted relative to the roof structure extends upwardly through the opening and lies mainly within the outer cylinder. A rectangular junction box is disposed within and extends across the lower portion of the inner cylinder and supports an upwardly directed axial fan. A flexible disk comprised of a closed-cell plastic foam is supported in the upper portion of the inner cylinder and serves as a silent automatic damper.

FIELD OF THE INVENION

This invention relates in general to an exhaust ventilator which is mounted upon a substantially horizontal roof of a coach trailer and more particularly to a compact ventilator including a junction box and an automatic quiet operating damper.

DESCRIPTION OF THE PRIOR ART

For many years, exhaust ventilators have been used for removing stale, warm air and odors, such as cooking odors, from living areas. For numerous reasons, such ventilators have not been completely satisfactory for use in coach trailers. A primary problem with such ventilators has involved back drafts, various attempts having been made to prevent same. At first, metal dampers were provided which could be manually opened and closed by manipulation of a chain or lever. Such structures were large and bulky and due to vibration of metal parts during operation were objectionably noisy. Since such dampers were manually operated, they were occasionally neglected and allowed to remain open even though the fan was not in operation resulting in backdraft in spite of the dampers being present. Also the dampers became difficult to open or close due to accumulation of dust, rust and corrosion in linkages and joints of the mechanisms. To overcome this problem, the use of ventilators having automatically actuated metal dampers have been purposed, such dampers being commonly spring or weight actuated. These ventilators too have failed to completely meet the needs of coach trailer ventilation since they are still noisy and subject to wear due to vibration of metal parts and the problem of corrosion is still present. In addition, such dampers are more costly and usually of even greater weight and size than the manually operated type.

The problems of providing a satisfactory exhaust ventilator for use in a coach trailer are further increased by the limited space in a coach trailer. Because of limited head room, the ventilator cannot extend much below the ceiling panel and for purposes of appearance the ventilator should extend only a short distance above the roof surface. In addition, the thin roof structure of a coach trailer will support only a limited amount of weight. It is therefore highly desirable that a ventilator for a coach trailer be both light in weight and compact.

It is desirable and usually necessary to provide the ventilators in coach trailers with a junction box, same generally being located alongside the vetilator. This still further increases the amount of space necessary for the ventilator and complicates installation.

Accordingly, it is the object of this invention to provide a compact ventilator having a fully automatic, quietly operating damper consisting of a foamed plastic disk.

Another object of this invention is to provide an exhaust ventilator of simple construction having an inexpensive automatically operated damper.

A further object of this invention is to provide a ventilator of compact construction having a minimum vertical dimension thereby extending a minimum distance above the roof structure.

Another principal object of this invention is to provide an economical, compact ventilator having a combination motor support and junction box disposed within the ventilator passageway.

Another object of this invention is to provide a fully automatic damper for a ventilator which damper provides a minimum amount of resistance to the fan operation, thereby maintaining good aerodynamic efficiency and which damper is compact, lightweight and noiseless.

Other objects and purposes of this invention will be apparent to persons acquainted with ventilators of this general type upon reading the following specification and inspecting the accompanying drawings.

Figure 4:
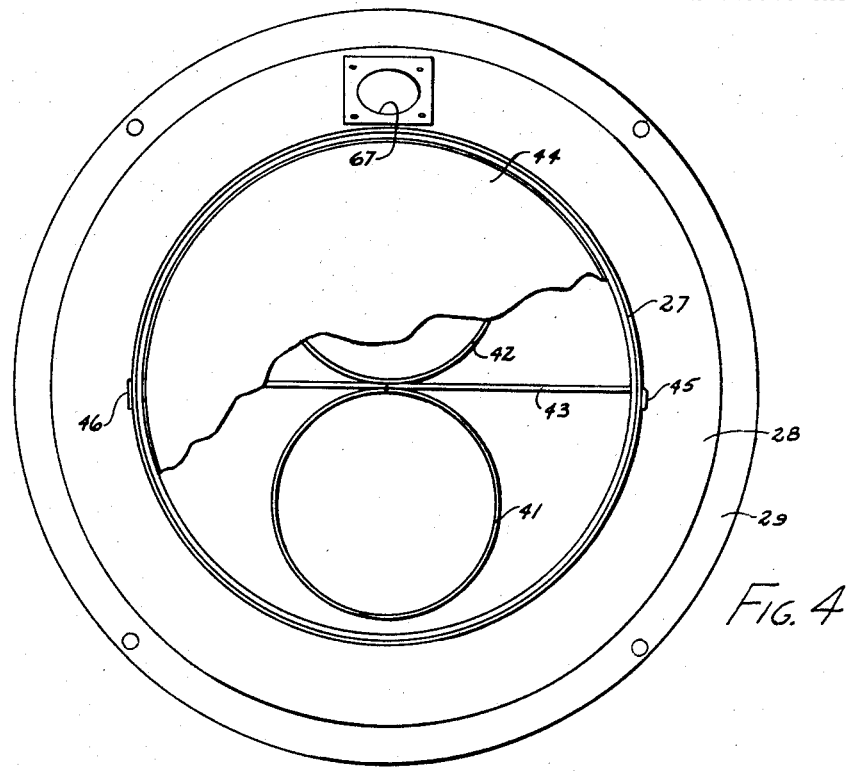
FIGURE 4 is a top view of the inner cylinder with a portion of the damper broken away.

Certain terminology will be used in the following description for convenience in reference only and will not be limiting. The words "upwardly," "downwardly," "rightwardly" and "leftwardly" will designate directions in the drawings to which reference is made. The words "inwardly" and "outwardly" will refer to directions toward and away from, respectively, the geometric center of the ventilator and designated parts thereof.

SUMMARY OF THE INVENTION

In general, the objects and purposes of the invention are met by providing a ventilator having an inner cylinder with a junction box disposed in the lower portion thereof and a damper disposed in the upper portion thereof. The junction box is rectangular in cross section and is provided for support of the fan motor and for enclosing the connection between the conductors extending from the motor and the conductors extending from a power source. The damper comprises a horizontal support member on which a flexible disk is mounted and secured at the center thereof. The ventilator has a protective grille covering the lower end of the inner cylinder and a weatherproofing cap protecting the upper end of the inner cylinder.

DESCRIPTION OF THE PREFERRED EMBODIMENT

Figure 1:
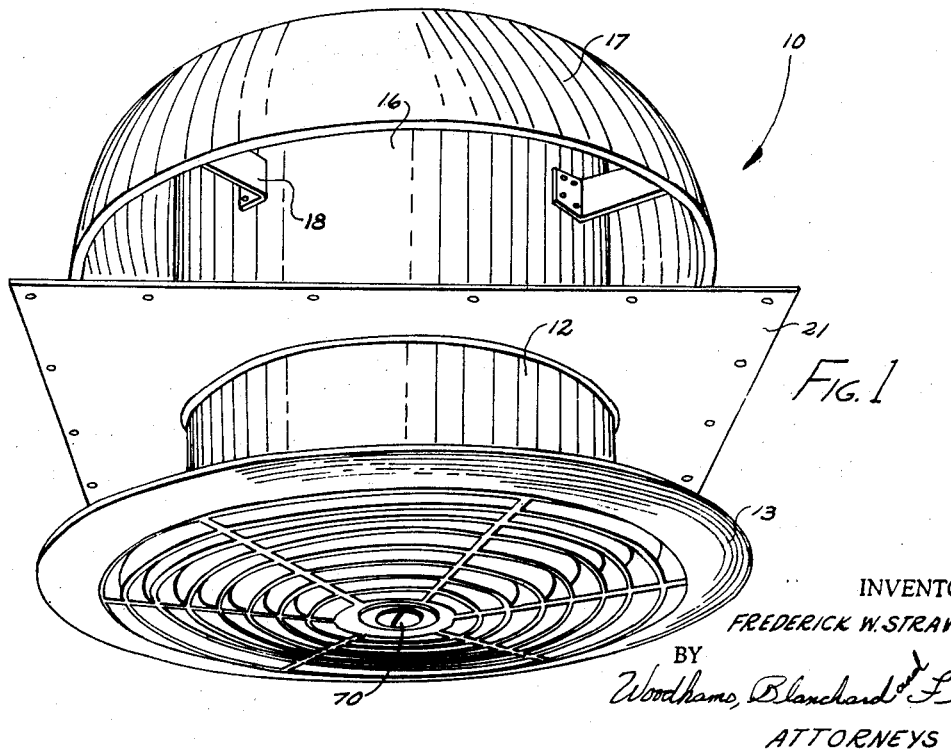
FIGURE 1 shows the ventilator of the present invention in perspective.
Figure 3:
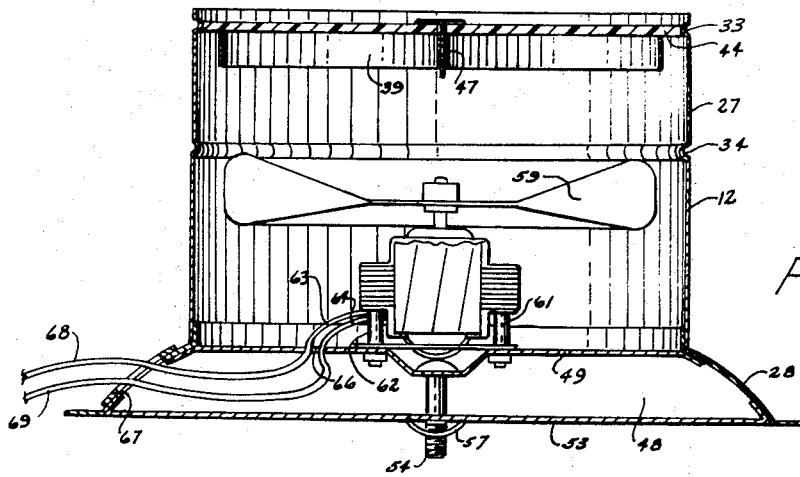
FIGURE 3 is a sectional view of the inner cylinder with the damper in a closed position.

The ventilator 10 of the present invention (FIGURE 1) includes a cap 11 which is disposed over the upper end of an inner cylinder 12. A grille 13 encloses the lower end of the inner cylinder 12.

Figure 2:
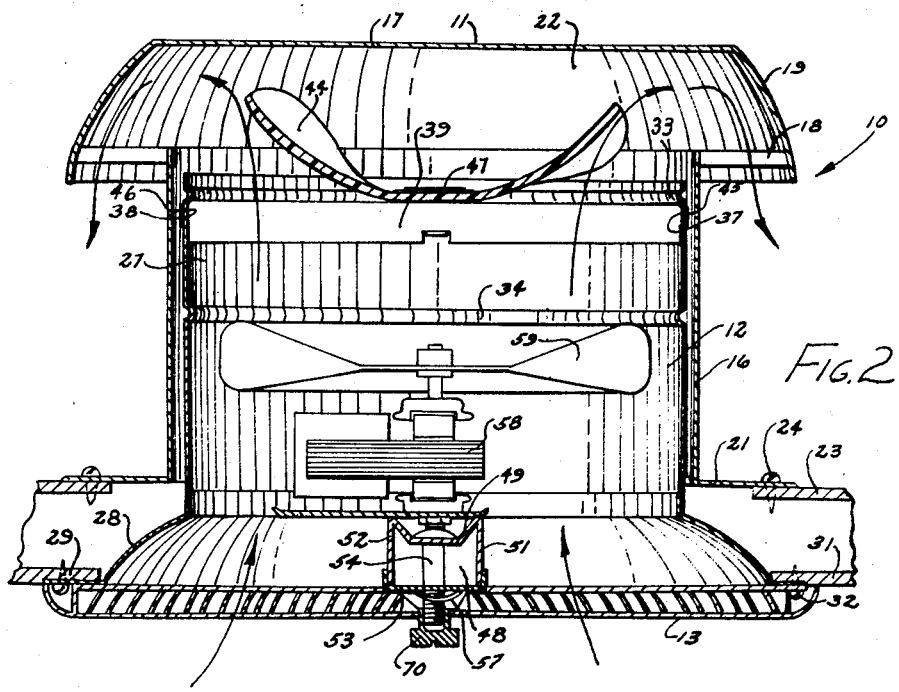
FIGURE 2 shows a sectional view of the ventilator in operation with the damper in an open position.

Cap 11 may be constructed of sheet metal or other suitable material and has a cylindrical portion 16 on which a weather dome 17 is mounted in spaced relationship in a conventional manner, such as by a plurality of radially extending flanges 18. Flanges 18 may be either riveted or welded at their respective ends to the cylinder 16 and the dome 17. The dome 17 (FIGURES 1 and 2), which is substantially wider than the diameter of the outer cylinder 16, is provided with an integral, downwardly extending, peripheral flange 19. Dome 17 thus provides a passageway 22 through which air may travel and still provides protection for the inner parts of the ventilator from rain and snow. A flange 21 is integral with the lower end of cylinder 16 and is provided for the mounting of cap 11 on the upper surface of the roof 23. The flange 21 may be of any shape such as circular or rectangular and may be secured to cylinder 16 by welding and attached to the upper surface of the roof 23 by screws 24.

The inner cylinder 12 has an upper portion 27 which is integral with an outwardly flaring lower portion 28. A flange 29 for mounting cylinder 11 extends outwardly from the lower end of portion 28. Flange 29 is secured to a ceiling panel 31 such as by screws 32. A pair of circumferential ribs 33 and 34 are pressed into upper portion 27 to make same more rigid. A pair of opposing slots 37 and 38 are provided in portion 27 for the mounting of damper support 39. The damper support 39 may be of any desired construction but is here illustrated as being fabricated of lightweight strap metal comprising a pair of circular members 41 and 42 (FIGURE 4) which are secured to a center strap 43 such as by welding. The center strap 43 has on each end thereof tabs 45 and 46 which are secured in slots 37 and 38. Alternatively, damper support 39 may be a flow straightener, however, such a straightener is not necessary to the invention. A closed-cell plastic foam disk 44, such as of a suitable polyvinyl chloride or urethane, is secured at its center to damper support 39 by pin 47. Disks made of any flexible plastic foam material which will not absorb grease and dirt may, of course, be used.

A junction box 48 is secured at each end thereof to the outwardly flaring portion 28. Junction box 48 is substantially rectangular in cross section having an upper wall 49 and a pair of sidewalls 51 and 52. A cover 53 encloses junction box 48. A bolt 54 extends through suitable openings provided in wall 49 and cover 53. A lock nut 57 is threadedly engaged with bolt 54, thereby retaining cover 53 in place.

A fan motor 58 having a blade 59 is supported on junction box 48 and secured thereto such as by bolts 61 and 62 which extend through suitable openings in upper wall 49. A pair of electrical conductors 63 and 64, extending from motor 58, pass through opening 66 in upper wall 49 into junction box 48 where they are connected to a pair of conductors 68 and 69 which pass through opening 67 and extend from an electrical source (not shown).

A decorative grille 13 usually covers the lower end of the cylinder 12 and is secured thereto by nut 70 which threadedly engages bolt 54.

OPERATION

Although the operation of the ventilator embodying the invention has been indicated somewhat above, said operation will be described in detail hereinbelow to assure a more complete understanding of the invention.

The conductors 68 and 69, extending from a power source (not shown), carry electrical current to conductors 63 and 64 which in turn transmit the current to motor 58. Since the conductors are connected within the junction box 48, the danger of fire is substantially eliminated. As motor 58 drives fan blade 59, the undesirable air is pulled from the living area and forced upwardly toward the disk 44. The center of the disk 44 is nonrotatably attached to the damper support 39 and the circumference of the disk 44 is free to move, but only in a vetrical direction. As the fan blade 59 forces air upwardly, opposite portions of the disk 44 are easily moved upwardly in an undulating ripple-like manner thereby allowing the air to pass by and out of ventilator 10. This movement is apparently proportional to the fan speed. Although disk 44 appears to be rotating, it is nonrotatably attached to the damper support 39. Such undulating movement seemingly lessens the turbulence and the resistance to the passing air much as would a rotating disk and yet without the structure, such as bearings, which would be required if the disk were actually to rotate. The disk 44 will drop down onto damper support 39 when motor 58 is not operating, thereby automatically and silently closing ventilator 10 and preventing backdraft.

Although a particular preferred embodiment of the invention has been disclosed above for illustrative purposes, it will be understood that variations or modifications thereof which lie within the scope of the appended claims are fully contemplated.

The embodiments of the invention in which an exclusive property or privilege is claimed are defined as follows:

1. A compact exhaust ventilator for mounting within an opening in a substantially horizontal roof, the combination comprising:
    a cylinder defining an air passageway and means for mounting said cylinder relative to said roof;
    a mounting member supported within a first portion of said cylinder and an upwardly directed axial blower supported upon said mounting member;
    a damper including a thin, nonrigid flexible disk of substantially the same diameter as said cylinder and stationary support means for horizontally supporting said disk within a second portion of said cylinder;
    said disk having one portion thereof axially secured to said support means with remaining portions of said disk integral with said one portion being freely axially displaced when air is forced upwardly through said passageway by said blower;
    whereby said disk closes said cylinder preventing backdraft when said axial blower is not in operation and whereby said disk is partially axially displaced allowing the upward passage of air when said blower is in operation.

2. The ventilator as defined in claim 1, wherein:
    said support means is comprised of a plurality of relatively narrow members with vertically disposed edges;
    said disk is comprised of closed-cell plastic foam and is secured at the center thereof to said support means, said disk being supported by the upper edges of said narrow members.

3. The ventilator as defined in claim 2, wherein:
    said disk is nonrotatably secured at the center thereof to said support means, the remaining portions of said disk being free to move in a vertical direction whereby operation of said ventilator produces an undulating ripple movement of said disk.

4. An exhaust ventilator for mounting upon a substantially horizontal roof, said ventilator having:
    substantially vertical walls defining a central passageway extending substantially in an upward direction;
    means for forcing air through said passageway;
    disk means and support means for supporting said disk means substantially horizontally within said passageway, said support means including a support member longitudinally stationarily positioned relative to said passageway and relative to said walls defining said passageway with said support member having a part thereof positioned within a central portion of said passageway; and
    said disk means comprising a thin, one-piece flexible disk member having a central portion thereof axially secured to said part of said support member with said disk member having sufficient flexibility whereby remaining portions thereof can be easily upwardly deflected longitudinally of said passageway a substantial amount relative to said central portion of said disk member for permitting the movement of air through said passageway.

5. An exhaust ventilator as defined in claim 4, wherein said disk member is constructed of a nonmetallic, plastic-like material and is secured at the center thereof to said support means.

6. An exhaust ventilator as defined in claim 4, wherein said disk member is constructed of an inelastic flaccid material whereby the remaining portions of said disk members are easily deflected due to flow of air through said passageway.

7. An exhaust ventilator as defined in claim 4, wherein said disk member is constructed from a nonrigid, sheet-like thin plastic material.

8. An exhaust ventilator as defined in claim 4, wherein said means for forcing air through said passageway includes motor means and a blower drivingly connected to said motor means with said motor means and said blower being positioned within said passageway, a mounting member fixedly secured to said walls and positioned adjacent one end of said passageway, means for fixedly securing said motor means to said mounting member, and said disk member being positioned substantially adjacent the other end of said passageway.

9. An exhaust ventilator as defined in claim 8, wherein said support means is longitudinally stationarily secured relative to said passageway and includes a plurality of support members of thin horizontal cross section, said support members having upper edges adapted to contact and support said disk member when same is not displaced by flow of air through said passageway, said support members being positioned centrally within and extending radially of said passageway for supporting at least the central portion of said disk member.

10. An exhaust ventilator as defined in claim 8, wherein said support means is longitudinally stationarily secured relative to said passageway and includes a plurality of support members of thin horizontal cross section, said support members having upper edges adapted to contact and support said disk member when same is not displaced by flow of air through said passageway, at least one of said support members being of ring-like configuration and positioned within said passageway for supporting at least a portion of said disk member thereon.

References Cited

UNITED STATES PATENTS

| | | | |
|---|---|---|---|
| 3,401,624 | 9/1968 | Mohrman | 98—119 X |
| 3,386,368 | 6/1968 | Fielding | 98—43 |
| 2,684,621 | 7/1954 | Cook | 98—116 |
| 3,012,495 | 12/1961 | Miller | 98—116 |
| 3,212,425 | 10/1965 | Hazen et al. | |
| 3,228,418 | 1/1966 | Rosback et al. | 137—525 X |
| 3,303,995 | 2/1967 | Boeckel | 230—117 |
| 3,306,179 | 2/1967 | Lambie et al. | 98—116 X |

WILLIAM E. WAYNER, Primary Examiner

U.S. Cl. X.R.

98—43; 137—525; 230—117